United States Patent [19]

Burrows

[11] Patent Number: 4,657,674

[45] Date of Patent: Apr. 14, 1987

[54] REVERSE OSMOSIS ASSEMBLY INCLUDING AN OPERATING VALVE

[76] Inventor: Bruce D. Burrows, 25530 Via Brava, Valencia, Calif. 91355

[21] Appl. No.: 685,546

[22] Filed: Dec. 24, 1984

[51] Int. Cl.$^4$ .............................................. B01D 13/00
[52] U.S. Cl. .................................. 210/110; 210/195.2; 210/257.2; 210/433.2
[58] Field of Search .................. 210/110, 195.2, 257.2, 210/321.1, 433.2; 137/599.1, 625.18, 625.27

[56] References Cited

U.S. PATENT DOCUMENTS 3,887,463  6/1975  Bray ..................................... 210/110
4,021,343  5/1977  Tyler ................................. 210/257.2

Primary Examiner—David Sadowski
Attorney, Agent, or Firm—William C. Babcock

[57] ABSTRACT

A single valve and associated conduits for so operating a reverse osmosis assembly that includes a reverse osmosis cartridge, a reservoir that has a movable barrier therein that sub-divides the interior into first and second confined spaces of variable volume, and a manually operated purified water dispensing valve, so that as the first confined space approaches a filled condition with purified water, the single valve throttles the flow of pressurized feed water to the cartridge to minimize the use of feed water in the operation thereof, with the maximum back pressure to which purified water is subjected in discharging from the cartridge is that due to the weight of reject water in the second confined space, and the membrane in the reverse osmosis cartridge being fast flushed with feed water to remove foreign material therefrom when the purified water dispensing valve is discharging purified water.

4 Claims, 1 Drawing Figure

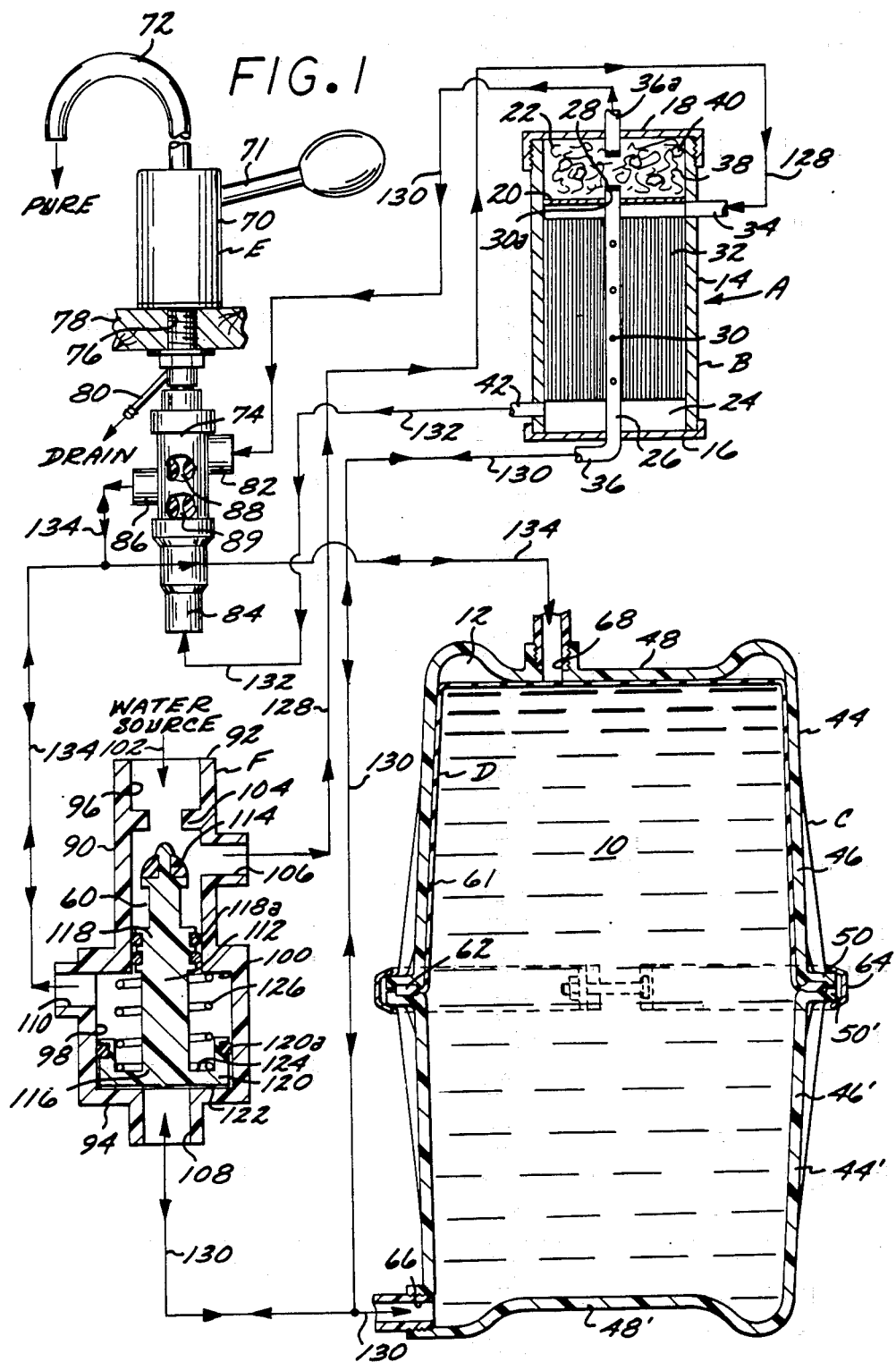

REVERSE OSMOSIS ASSEMBLY INCLUDING AN OPERATING VALVE

DESCRITPION OF THE PRIOR ART

In prior art reverse osmosis assemblies of the type that are located under the sink in a kitchen, the purified water discharges from the reverse osmosis cartridge at a substantial back pressure that prevents the assembly operating at optimum efficiency, and also the rate of flow of feed water to the reverse osmosis cartridge continuing at a uniform rate even when the purified water storage facility is approaching the maximum volume for which it is designed.

A major object of the present invention is to provide a single valve that throttles and reduces the rate of flow of pressurized feed water to the reverse osmosis cartridge when the reservoir for purified water has reached substantially the maximum volume for which it is designed, and as a result a reverse osmosis assembly including the present invention may be operated over a prolonged period of time, with substantially less use of pressurized feed water than with prior art devices of this nature, and with a resultant monetary saving to the user.

Another object of the invention is to furnish a reverse osmosis assembly that includes the present invention that so operates that the maximum back pressure to which purified water is subjected in discharging from the reverse osmosis cartridge is that due only to the quantity of reject water situated in a second confined space of variable volume that is located above the first confined space in which purified water is stored, and the weight of water in a conduit leading from the second confined space to a purified water dispensing valve.

A further object of the invention is to supply an assembly that not only has the operational advantages above enumerated, but in addition one that permits the addition of minerals that are desirous to be incorporated in purified water for health purposes prior to the purified water being discharged from the purified water dispensing valve.

These and other objects and advantages of the invention will become apparent from the following description of a preferred form thereof.

CROSS REFERENCE TO RELATED APPLICATIONS

The present application is a substitute application for patent application Ser. No. 458,165, filed Jan. 14, 1983, now abandoned, which application was a continuation of Ser. No. 380,635, filed May 21, 1982, now abandoned which was a continuation-in-part of patent application Ser. No. 219,331, now abandoned.

SUMMARY OF THE INVENTION

The valve of the present invention is used in combination with a source of pressurized feed water, and a reverse osmosis assembly. The reverse osmosis assembly includes a reverse osmosis containing cartridge having a feed water inlet, a reject water outlet, and a purified water outlet, The assembly further comprises a reservoir container that includes a movable barrier that sub-divides the interior thereof into first and second confined spaces of variable volume that are in communication with first and second passages in the reservoir container.

The assembly also includes a purified water dispensing valve that has a purified water inlet and a purified water dispensing outlet, a reject water drain outlet, and a reject water passage and inlet, dual flow restrictors, and a two position valve actuator which is illustrated as being a handle that is manually operated although an electrical, hydraulic, or mechanical actuator may be used if desired. The actuator when in a first position obstructs communication between the purified water inlet and purified water dispensing outlet and allows reject water that enters the purified water dispensing valve through the reject water inlet to flow through the first and second flow restrictors prior to discharging from the reject water drain outlet. Reject water in the second confined space as the latter contracts in volume due to discharge of purified water into the first confined space flows into the reject water passage and through the second flow restrictor to the drain outlet.

The two position actuator when in a second position allows purified water to flow from the purified water inlet to the purified water dispensing outlet and reject water entering the reject water inlet to substantially by-pass the first flow restrictor and flow out of the reject water passage to the second confined space to increase the volume thereof and force purified water from the first confined space. When the actuator is returned to the first position the dispensing of purified water is terminated, with purified water now flowing to the first confined space, and reject water in the second confined space being displaced therefrom to flow through the reject water passage and second flow restrictor to the drain outlet. The valve of the present invention after the first confined space has been substantially filled with purified water throttles and reduces the rate of flow of feed water to the reverse osmosis cartridge to minimize the quantity of feed water required to provide the reservoir with a stored quantity of purified water that may be intermittently withdrawn therefrom by use of the purified water dispensing valve.

The valve of the present invention includes an elongate vertically positioned valve body that has an upper end and a bottom, an elongate passage extends downwardly from the upper end to develop into an axially aligned elongate chamber of substantially greater transverse area than that of said elongate passage, with the chamber partially defined by the bottom and a body shoulder at the junction of the elongate passage and chamber.

The elongate passage is in communication with the source of pressurized feed water. A ring shaped valve seat is situated in the elongate passage. A feed water outlet in the valve body is in communication with the elongate passage below the valve seat. A purified water passage is defined in the bottom, and a reject water passage is also defined in the valve body that communicates with the chamber upwardly a substantial distance from the bottom.

An elongate valve member is movably disposed in the valve body with the valve member including upper and lower end surfaces, and the upper end surface capable of sealing with the valve seat when the valve member is in a first position. The valve member includes a first piston intermediate the upper and lower ends thereof, which first piston slidably and sealingly engages the elongate passage. A second piston is on the lower end surface of the valve member, with the second piston slidably and sealingly engaging the walls of the chamber. The second piston has a lower end surface and a ring shaped upper end surface of lesser transverse area than the lower end surface. A pressurized feed water source is connected to the upper end of the elongate passage and exerts a first downward force on the valve member that tends to move the valve member downwardly from a first to a second position where the pressurized feed water is free to flow through the feed water outlet in the valve body. A spring is disposed in the chamber of the valve body that exerts a second downward force on the valve member and second piston in addition to the first force exerted on the valve member by the pressurized feed water contacting the upper end surface of the valve member.

A number of conduits are employed in operating the valve of the present invention in association with the reverse osmosis assembly. The conduits include a first conduit that connects the feed water outlet in the valve body to the feed water inlet in the reverse osmosis cartridge. A second conduit extends between the purified water outlet of the reverse osmosis cartridge and communicates with the first passage in the purified water reservoir container, the purified water passage in the valve body, and purified water inlet in the purified water dispensing valve body.

A third conduit extends between the reject water outlet of the reverse osmosis cartridge and the reject water inlet of the purified water dispensing valve. A fourth conduit is in communication with the second passage of the reservoir container, the reject water passage in the purified water dispensing valve, and the reject water passage in the valve body of the present invention.

When the actuator is moved to a second position, communication is established between the first confined space containing the purified water, and the purified water dispensing outlet. Substantially all pressurized feed water now flowing into the reverse osmosis cartridge fast flows across the membrane therein to remove foreign material therefrom and then enters the second confined space to expand it, and the reject water in the second confined space exerting a first pressure through the barrier on the purified water in the first confined space that causes the purified water to flow therefrom and discharge through the purified water dispensing outlet. The reject water not only exerts a first pressure on the barrier, but also exerts a downward force on the upper surface of the second piston that keeps the valve member in the second position.

When the actuator is returned to the first position, communication between the purified water in the first confined space and the purified water dispensing outlet is obstructed. The valve member of the present invention remains in the second position to allow pressurized feed water to flow to the reverse osmosis cartridge and purified water flowing from the reverse osmosis cartridge to the first confined space to expand the latter. Reject water from the reverse osmosis cartridge flows through the third conduit to the reject water inlet in the purified water dispensing valve and then through the first and second flow restrictors to the reject water drain outlet, and concurrently reject water in the second confined space is forced therefrom as the first confined space expands. Reject water in the second confined space flows through the fourth conduit to the reject water passage in the purified water dispensing valve and then through the second flow restrictor to the reject water drain outlet. The flow of purified water and reject water so continues until the first confined space approaches a maximum volume, and the pressure on purified water therein increasing to the extent that it exerts an upward force on the lower surface of the second piston which is greater than the combined force exerted by the spring and the force exerted by the pressurized feed water on the upper end of the first piston and upper end of the valve member. Due to this increased force on the lower surface of the second piston and valve member moves upwardly towards the first position and in so doing throttles and reduces the rate of flow of pressurized feed water to the reverse osmosis cartridge, and a consequent saving of feed water being achieved.

BRIEF DESCRIPTION OF THE DRAWINGS

FIG. 1 is a diagrammatic view of the reverse osmosis assembly, with the valve of the present invention illustrated as being associated therewith to throttle the flow of feed water to the reverse osmosis cartridge as the purified water reservoir becomes substantially filled with purified water.

DESCRIPTION OF THE PREFERRED EMBODIMENT

The reverse osmosis assembly A as shown in FIG. 1 and includes a reverse osmosis cartridge B and a reservoir container C that has a movable barrier D therein, which barrier sub-divides the interior of the reservoir container into a first confined space 10 and second confined space 12 of variable volumes. The assembly includes a purified water dispensing valve E that also controls the flow of reject water, and this valve being shown in detail in my co-pending patent application Ser. No. 295,696 filed in the Patent Office on Aug. 24, 1981 and entitled "Combined Purified Water Dispensing Device and Reject Water Control Device". A single valve F is shown in FIG. 1 which is the subject matter of the present invention, which valve throttles the flow of feed water to the reverse osmosis cartridge B when the purified water has discharged into the first confined space 10 to the extent that the latter is of substantially maximum volume.

The reverse osmosis cartridge B is illustrated in FIG. 1 as including a cylindrical sidewall 14 that has a first end piece 16 and a second end piece 18 removably mounted thereon. A transverse partition 20 is situated within the cylindrical sidewall 14 and sub-divides the interior of the cartridge B into first and second compartments 22 and 24. A rigid tube 26 is longitudinally disposed within the cartridge B and extends through the partition 20 to terminate in an upper closed end 28. A series of openings 30 are formed in the portion of the tube in the second compartment 24 and similar openings 30a are formed in the portion of the tube situated in the first compartment 22. A reverse osmosis membrane 32 is disposed in the second compartment 24 and envelopes the portion of the tube 26 therein that has the openings 30 therein.

The cartridge B has a first purified water outlet 36 and a second purified water outlet 36a. The first compartment 22 contains activated carbon 38 and may also contain pellets or particles of a soluble mineral compound 40 such as dolomite or the like, which dissolves in the purified water prior to the same being dispensed from the reverse osmosis assembly A. For health purposes, it may be desirable to add magnesium and calcium to the purified water by contact with dolomite 40 or by other means. The reverse osmosis cartridge B includes a reject water outlet 42 in communication with the second compartment 24.

The reservoir container C is illustrated as being formed from two cup shaped members 44 and 44' that have conical sidewalls 46 and 46' that merge into end pieces 48 and 48'. The free ends of the sidewalls 46 and 46' develop into outwardly extending ring shaped flanges 50 and 50' as shown in FIG. 1.

The movable barrier D is illustrated in FIG. 1 as being in the form of a cup 61 that is formed from a pliable water impervious material such as rubber that is non-toxic when in contact with the purified water, and the cup 61 on the free ends developing into an outwardly extending ring shaped flange 62.

The flange 62 as shown in FIG. 1 is disposed between the flanges 50 and 50', and the flanges 50 and 50' being engaged by a circumferentially tensionable band 64 that when tightened draws the flanges 50 and 50' together and exerts a sealing force on the flange 62. The cup shaped member 44 has a reject water passage 68 therein, and the cup shaped member 44' has a purified water passage 66 therein that communicates with the first confined space 10.

The purified water dispensing valve E through which reject water may also flow includes a body 70 that has a purified water dispensing spout 72 extending upwardly therefrom and an extension 74 of the body 70 extending downwardly through an opening 76 defined in a drain board 78 that normally will be disposed adjacent a sink (not shown). The extension 74 has a reject water drain 80 extending downwardly and outwardly therefrom and also having a purified water inlet 82 and a reject water inlet 84, as well as a reject water passage 86. First and second flow restrictors 89 and 88 are disposed within the extension 74. Valve E includes a two position actuator 71 that may occupy either first or second positions. When the actuator 71 is in a first position flow of purified water from inlet 82 to spout 72 is obstructed, and reject water flowing into inlet 84 must flow through both first and second flow restrictors 89 and 88 prior to discharging to the drain 80 as described in detail in my co-pending patent application Ser. No. 295,696. When the actuator 71 is in the second position purified water may flow from the inlet 82 to the spout 72, and reject water entering the inlet 84 substantially bypassing the first flow restrictor 89 to flow from passage 86 for reasons that will later be described. Also, for reasons that will later be described reject water flowing into passage 86 must flow through second flow restrictor 88 prior to discharging from drain 80. In summary, all reject water entering inlet 84 must flow through at least second flow restrictor 88 prior to discharging to drain 80.

The single valve F includes an elongate valve body 90 that has an upper end 92 and bottom 94. An elongate passage 96 extends downwardly from the upper end 92 to develop into a chamber 98 that is of substantially greater transverse cross section. The passage 96 and chamber 98 at their junction defines a body shoulder 100. The upper end of passage 96 is in communication with a source 102 of pressurized feed water.

A ring shaped valve seat 104 projects inwardly into the passage 96 and is intermediately disposed between the upper end 92 and a feed water outlet 106 that is in communication with the passage 96. A purified water passage 108 is formed in the bottom 94 and communicates with the chamber 98. A reject water passage 110 is formed in the valve body 90 and communicates with the upper portion of the chamber 98.

The single valve F includes an elongate valve member 112 that has an upper end 114 and a lower end 116. The valve member 112 adjacent the upper end 114 has a first piston 118 that extends outwardly therefrom and supports a number of sealing rings 118a that are in slidable sealing contact with the portion of the valve body defining the passage 96. A second piston 120 that supports sealing rings 120a is mounted on the lower end 116 of the valve member 112 and is longitudinally and sealingly movable in the chamber 98.

The second piston 120 has a lower end surface 122 and an upper ring shaped surface 124 that is of less transverse cross section than the lower end surface 122.

A first conduit 128 extends between the pressurized feed water outlet 106 and the feed water inlet 34 in the reverse osmosis cartridge B. The first purified water outlet 36 of reverse osmosis cartridge B is in communication with a second conduit 130 that communicates with the purified water passage 108 and the purified water passage 66 in the reservoir container C, which passage 66 is in communication with the first confined space 10.

The second purified water outlet 36a is connected by another portion of the second conduit 130 to the purified water inlet 82 in the purified water dispensing valve E as shown in FIG. 1. A third conduit 132 is in communication with the reject water outlet 42 and the reject water inlet 84, in the valve E. A fourth conduit 134 is in communication with the reject water passage 68 in the reservoir container C, which passage 68 is in communication with the second confined space 12, and the fourth conduit 134 also being in communication with the reject water passage 86 in the valve E and the reject water passage 110 in the single valve F.

Discharge of purified water from the dispensing spout 72 in the first valve E is controlled by the actuator 71, with the actuator 71 when in a first position obstructing communication between the second conduit 130 and the dispensing spout 72. Purified water discharging from the reverse osmosis cartridge B will flow through the second conduit 130 to the purified water passage 66 to enter the first confined space 10 as well as the purified water passage 108 that communicates with the chamber 98 below the second piston 120.

When the actuator 71 is in the first position, reject water from the reverse osmosis cartridge B flows through the third conduit 132 to the reject water inlet 84 in the purified water dispensing valve E to flow upwardly through the valve and the first and second flow restrictor 89 and 88 to discharge through the drain outlet 80.

When the actuator 71 is moved to a second position, communication is established between the purified water inlet 82 and the purified water dispensing spout 72. Purified water may now flow from the first confined space 10 through the second conduit 130 to tube 26 and openings 30a into the first compartment 22 to be subjected to the activated carbon 38 therein which removes dissolved gases from the purified water. The purified water discharges through the second outlet 36a into the portion of the second conduit 130 that extends to the purified water inlet 82 in the purified water dispensing valve E. Purified water entering the inlet 82 in valve E can flow through the valve to discharge from the purified water dispensing spout 72 only when the actuator 71 is in the second position. The purified water supplied to spout 72 will contain dissolved minerals due to contact with the dolomite particles 40. The particles 40 if desired may be preformed tablets that are formulated to contain desired minerals that are considered advantageous to the health of the users of purified water from the invention.

When the actuator 71 is in the second position reject water discharges through the third conduit 132 to enter the reject water inlet 84 of the valve E to substantially by-pass the first flow restrictor 89 and flow through the reject water passage 86 into the fourth conduit 134. Due to the reject water by-passing the first flow restrictor 89 the rate of flow of reject water into the fourth conduit 134 is at a rapid rate as it is subjected to substantially no back pressure. Substantially all the feed water flowing into the reverse osmosis cartridge B discharges therefrom as reject water into the third conduit 132 during this phase of operation of the invention.

The pressurized feed water from the source 102 a may be seen in FIG. 1 at all times exerts a downward force on the upper end 114 of valve member 112 that tends to cause the valve member 112 to move downwardly from a first position where end 114 was in abutting contact with valve seat 104 to a second position where upper end 114 is below valve seat 104.

As reject water at a rapid rate flows into the second confined space 12 through the fourth conduit 134 as well as to the chamber 98 through another portion of the conduit 134, the pressure on reject water in the second confined space 12 increases and exerts a downward force through the barrier D onto the purified water in the first confined space 10, with purified water being forced therefrom to flow through the second conduit to the valve E to discharge from the dispensing spout 72.

The lower surface 122 of second piston 120 that is exposed to purified water is substantially greater than the upper ring shaped surface 124 of the second piston that is in contact with reject water in chamber 98.

The pressure on the purified water in the first confined space 10 increased to exert an upwardly directed force on the lower surface 122 of the first piston 120, but with this force being less than the forces exerted by the pressurized reject water on the upper ring shaped surface 124 of the second piston 120, and pressurized feed water on the upper end 114 of valve member 112 and upper surface of first piston 118. The valve member 112 during the dispensing of purified water will remain in the second position.

When the actuator 71 is returned to the first position flow of purified water from the purified water inlet 82 of the valve E to the dispensing spout 72 is obstructed. Purified water from the reverse osmosis cartridge B now flows through the second conduit 130 to the first confined space 10. As purified water continues to discharge through the second conduit 130 into the first confined space 10, the first confined space 10 expands and exerts an upward force on reject water in the second confined space 12, with the reject water being forced from the second confined space 12 through the fourth conduit 134 to the reject water passage 86 in the purified water dispensing valve E, with the reject water subsequently flowing upwardly through the second restrictor 88 to discharge through the reject drain outlet 80.

After purified water has discharged from the reverse osmosis cartridge B through the second conduit 130 to the first confined space 10 to the extent that the confined space is approaching maximum volume, the purified water in the first confined space exerts a pressure through the second conduit 130 on the lower end surface 122 of the piston 120 that is sufficient to overcome the first downward force exerted by the pressurized water on the upper valve member end 114 and upper surface of the first piston 118, with the valve member 112 now moving upwardly for the upper end 114 thereof to approach the valve seat 104 and throttle the flow of feed water to the reverse osmosis cartridge B after the first confined space 10 is substantially filled with purified water. Such throttling results in a substantial saving of the quantity of pressurized feed water required to operate the reverse osmosis assembly A over a period of time and a substantial saving in money being effected to the user of the assembly.

From experience it has been found that when the pressure on feed water source 102 is relatively low there will not be a first force exerted on the valve member end 114 and upper surface of first piston 118 sufficient to overcome the friction offered by the sealing rings 118a and 120a as the valve member 112 tends to be forced from the first to the second position. To nulify this frictional resistance a compressed helical spring 126 is provided that encircles valve member 112 in chamber 98. With one end of the spring abutting against body shoulder 100 and the opposite end against second piston 120. When the pressure on the feed water source 102 is sufficiently high to overcome the frictional resistance above described the spring 124 may be dispensed with.

The use and operation of the invention has been explained previously in detail and need not be repeated.

What is claimed is:

1. In combination with a source of feed water for providing feed water at a first pressure; a reverse osmosis membrane containing cartridge that includes a feed water inlet, a reject water outlet, and a purified water outlet; a reservoir container that includes a movable barrier that subdivides an interior of said reservoir container into first and second confined spaces of variable volume that are in communication with first and second passages in said reservoir container; a purified water dispensing valve that includes a purified water inlet, a purified water dispensing outlet, a reject water inlet, a reject water drain outlet, a reject water passage, first and second flow restrictors, and a movable two position actuator, said actuator when in a first position obstructing communication between said purified water inlet and said purified water dispensing outlet and providing a flow path for reject water that enters said purified water dispensing valve through said reject water inlet to flow through said first and second flow restrictors to said reject water drain outlet, and said actuator when in a second position providing a flow path for purified water to flow from said purified water inlet to said purified water dispensing outlet and for reject water entering said reject water inlet to bypass said first and second flow restrictors and flow outwardly through said reject water passage; and a control valve and a plurality of conduit means associated therewith and with said reverse osmosis cartidge, said reservoir container, and said purified water dispensing valve whereby subsequent to said first confined space being substantially filled with purified water, said control valve throttles and reduces rate of flow of feed water at said first pressure to said reverse osmosis cartridge to minimize a quantity of feed water required to provide said reservoir container with stored purified water that may be intermittently withdrawn therefrom by use of said purified water dispensing valve, said control valve including:

(a) an elongate vertically positionable valve body having an upper end and a bottom, an elongate passage that extends downwardly from said upper end to develop into an axially aligned elongate chamber of substantially greater transverse area than that of said passage, said chamber partially defined by said bottom and a body shoulder at a junction of said passage and chamber, said elongate passage in communication with said source of feed water at said first pressure; a ring shaped valve seat in said elongate passage; a pressurized feed water outlet in said valve body in communication with said elongate passage below said valve seat; a purified water passage in said bottom; a reject water passage in said valve body that communicates with said chamber a substantial distance above said bottom;

(b) an elongate valve member movably disposed in said valve body, said valve member including upper and lower ends, said upper end defining an upper end surface and sealing with said valve seat when said valve member is in a first position, said valve member including a first piston intermediate said upper and lower ends that slidably and sealingly engages said elongate passage, said first piston having an upper end surface, and a second piston on said lower end of said valve member that slidably and sealingly engages said chamber, said second piston having a lower end surface defining a lower end surface area and a ring shaped upper end surface defining an upper end surface area being of less area than said lower end surface area of said second piston, means for providing communication between said source of feed water and both said elongate passage and said valve member for providing said feed water at said first pressure contacting said upper end surfaces of said valve member and first piston to exert a first downward force on said valve member that moves said valve member from said first to a second position where said feed water is free to flow from said feed water outlet in said valve body;

(c) conduit means that include a first conduit that connects said feed water outlet in said valve body and said feed water inlet in said cartridge; a second conduit that extends between said purified water outlet, said first passage in said reservoir container, said purified water passage in said valve body, and said purified water inlet in said purified water dispensing valve; a third conduit that extends between said reject water outlet of said reverse osmosis cartridge and said reject water inlet in said purified water dispensing valve; a fourth conduit that connects said reject water passage in said purified water dispensing valve and said reject water passage in said control valve to said second passage in said reservoir container, said actuator when in said first position obstructing communication between said purified water inlet and purified water dispensing outlet while providing a flow path for reject water from said reject water outlet flowing through said third conduit to said reject water inlet in said purified water dispensing valve to thereafter flow through said first and second flow restrictors to said drain outlet and for reject water entering said reject water passage in said purified water dispensing valve to flow through said second flow restrictor to said drain outlet, while purified water from said purified water outlet flows through said second conduit to said first passage in said reservoir container and to said purified water inlet in said purified water dispensing valve; and said actuator when moved to said second position establishing communication between said purified water inlet and said purified water dispensing outlet and providing a flow path for reject water from said reject water outlet through said third conduit to said reject water inlet to bypass said first and second flow restrictors to enter said fourth conduit to expand said second confined space and to said reject water passage in said control valve to exert a second downward force on said upper surface of said second piston, with said first and second forces when combined being of greater magnitude than a third upward force exerted on said lower end surface of said second piston by purified water that has been pressurized by the expansion of said second confined space, with said actuator when returned to said first position terminating flow of purified water from said purified water dispensing outlet, with purified water from said purified water outlet discharging through said second conduit to said first confined space and chamber to expand said first confined space and force reject water from said second confined space, with flow of purified water so continuing until pressure of purified water in said chamber increases to the extent that it exerts a third force on said lower surface of said second piston of a magnitude greater than said combined first and second forces and said valve member moving upwardly from said second towards said first position to throttle and reduce a rate of flow of said pressurized feed water to said reverse osmosis cartidge.

2. Apparatus including a control valve in combination with a source of pressurized feed water for providing pressurized feed water, a reverse osmosis cartridge having a pressurized feed water inlet, a purified water outlet and a reject water outlet, and a reservoir container that includes a movable barrier that subdivides an interior of said reservoir container into first and second confined spaces of variable volume, and purified and reject water passages in said reservoir container in communication with said first and second confined spaces, said control valve throttling and reducing rate of flow of said pressurized feed water to said reverse osmosis cartridge when a predetermined pressure of purified water in said first confined space exceeds a pressure of reject water in said second confined space, said control valve including:

(a) an elongate vertically positionable valve body having an upper end and a bottom, an elonagte passage that extends downwardly in said valve body from said upper end to develop into an axially aligned elongate chamber of substantially greater transverse cross sectional area than that of said elongate passage, means providing that said elongate passage at said upper end of said valve body is in communication with said source of pressurized feed water, said chamber partially defined by said bottom and a body shoulder at a junction of said elongate passage and said chamber; a ring shaped valve seat in said passage intermediate said upper end and body shoulder; a pressurized feed water outlet in said valve body in communication with said elongate passage below said valve seat, means providing that said pressurized feed water outlet is in communication with said pressurized feed water inlet in said reverse osmosis cartridge, means providing that said purified water outlet of said reverse osmosis cartridge is in communication with said purified water passage and said first confined space of said reservoir container and a purified water passage in said bottom of said valve body, means providing that said reject water outlet of said reverse osmosis cartridge is in communication with said reject water passage in said reservoir container and said second confined space as well as a reject water passage in said valve body that communicates with said chamber upwardly a predetermined distance from said bottom; and (b) an elongate valve member movably disposed in said valve body, said vlave member including upper and lower ends, said upper end defining an upper end surface and sealing with said valve seat when said valve member is in a first position, said valve member including a first piston intermediate said upper and lower ends that slidably and sealingly engages said elongate passage, said first piston having an upper end surface and a second piston on said lower end of said valve member that slidably and sealingly engages said chamber, said second piston having a lower end surface defining a lower end surface area and a ring shaped upper end surface defining an upper end surface area being of less surface area than said lower end surface area of said second piston, said pressurized feed water exerting a first downward force on said upper end surfaces of said valve member and first piston that moves said valve member from said first to a second position where said pressurized feed water is free to flow from said pressurized feed water outlet in said valve body to said pressurized feed water inlet in said reverse osmosis cartridge to be transformed to purified water and reject water, with said reject water exerting a second downward force on said upper end surface of said second piston, with said first and second forces maintaining said valve member in said second position so long as pressure on purified water in said first confined space is not greater than that of reject water in said second confined space, but said purified water when pressure thereon increases a predetermined magnitude above that on reject water in said second confined space exerting a third force that is directed upwardly on said lower end surface of said second piston and said valve member being moved upwardly towards said first position to throttle and reduce a rate of flow of said pressurized feed water from said feed water outlet in said valve body to said reverse osmosis cartridge.

3. Apparatus including a control valve in combination with a source of pressurized feed water for providing pressurized feed water, a reverse osmosis cartridge having a pressurized feed water inlet, a purified water outlet and a reject water outlet, and a reservoir container that includes a movable barrier that subdivides an interior of said reservoir container into first and second confined spaces of variable volume and purified and reject water passages in said reservoir container in communication with said first and second confined spaces, said control valve throttling and reducing rate of flow of said pressurized feed water to said reverse osmosis cartridge when a predetermined pressure of purified water in said first confined space exceeds a pressure of reject water in said second confined space, said control valve including:

(a) an elongate vertically positionable valve body that has an upper end and a bottom, a passage that extends downwardly in said valve body from said upper end to develop into a chamber of substantially greater transverse cross section, a ring shaped valve seat in said passage intermediate said upper end and chamber, means providing that said passage adjacent said upper end is in communication with said source of pressurized feed water; a pressurized feed water outlet in said valve body intermediate said valve seat and chamber, means providing that said pressurized feed water outlet is in communication with said pressurized feed water inlet; a purified water passage in said bottom in communication with said chamber, means providing that said purified water outlet of said reverse osmosis cartridge is in communication with said purified water passage and said first confined space of said reservoir container and said purified water passage in said bottom of said valve body; and a reject water passage in said valve body in communication with said chamber a predetermined distance above said bottom, means providing that said reject water outlet of said reverse osmosis cartridge is in communication with said reject water passage in said reservoir container and said second confined space as well as said reject water passage in said valve body;

(b) an elongate valve member having upper and lower ends defining upper and lower end surfaces respectively longitudinally disposed in said passage and chamber, said valve member including a first piston intermediate said upper and lower end surfaces and that includes an upper surface, and a second piston that extends outwardly from said lower end surface, said second piston having upper and lower surfaces, said first piston slidably disposed in said passage and said second piston slidably disposed in said chamber, with said pressurized feed water at all times in contact with said upper end surface of said valve member and said upper surface of said first piston and exerting a first downward force on said valve member that tends to move said valve member from a first position where said upper end is in sealing contact with said valve seat to a second position where said upper end is disposed downwardly from said valve seat a sufficient distance to permit substantially free flow to said pressurized feed water outlet, with reject water in said chamber exerting a second downward force that augments said first force in tending to move said valve member from said first to said second position, whereby a predetermined pressure of purified water in said chamber exerts a third force upwardly on said lower surface of said second piston greater than that of the combined first and second forces moving said valve member from said second toward said first position to throttle flow of pressurized feed water from said pressurized feed water outlet to said pressurized feed water inlet.

4. Apparatus as recited in claim 3 in which said passage and chamber at their junction define a body shoulder, and said control valve in addition including:
   (c) first and second resilient sealing means on said first and second pistons that are in frictional sliding contact with a portion of said valve body defining said passage and chamber; and
   (d) a compressed helical spring in said chamber that encircles said valve member and has an upper end in abutting contact with said body shoulder and a lower end in contact with said upper surface of said second piston, said spring exerting a downward force on said valve member that augments said first force in overcoming said frictional sliding contact.

* * * * *